(12) United States Patent
Kim et al.

(10) Patent No.: US 7,817,577 B2
(45) Date of Patent: Oct. 19, 2010

(54) METHOD FOR BALANCING QUALITY OF WIRELESS COMMUNICATION CHANNEL AND WIRELESS COMMUNICATION APPARATUS USING THE SAME

(75) Inventors: Jun-Whan Kim, Daejeon (KR); Jae-Doo Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 155 days.

(21) Appl. No.: 12/084,693

(22) PCT Filed: Nov. 8, 2006

(86) PCT No.: PCT/KR2006/004667

§ 371 (c)(1),
(2), (4) Date: May 8, 2008

(87) PCT Pub. No.: WO2007/055512

PCT Pub. Date: May 18, 2007

(65) Prior Publication Data

US 2009/0109866 A1 Apr. 30, 2009

(30) Foreign Application Priority Data

Nov. 10, 2005 (KR) .................... 10-2005-0107553

(51) Int. Cl.
*H04L 12/26* (2006.01)
(52) U.S. Cl. .................. 370/252; 370/241; 455/67.13
(58) Field of Classification Search ............... 370/252, 370/253, 241, 328–333, 338, 348; 455/513, 455/522, 67.13, 115.3
See application file for complete search history.

(56) References Cited

U.S. PATENT DOCUMENTS 5,467,341 A * 11/1995 Matsukane et al. .......... 370/253

(Continued)

FOREIGN PATENT DOCUMENTS

JP 9-219697 8/1997

(Continued)

OTHER PUBLICATIONS

International Search Report mailed Jan. 30, 2007 in connection with the International application PCT/KR2006/004667.

*Primary Examiner*—Chi H Pham
*Assistant Examiner*—Robert Lopata
(74) *Attorney, Agent, or Firm*—Staas & Halsey LLP

(57) ABSTRACT

Disclosed herein are a method for balancing the quality of a wireless communication channel wherein the quality of the wireless communication channel can be more accurately estimated and adjusted on the basis of the combination of observation results of the number of data frames failed to be transmitted in the past and a received signal strength (RSS), and reliability of data transmission over the channel can thus be increased, and a wireless communication apparatus using the same. The method includes collecting information about whether data frames have been successfully transmitted and information about RSSs of the wireless communication channel, acquiring the number of data frames failed to be transmitted and an average RSS in a predetermined observation period using the collected information, comparing the acquired transmission-failed data frame number with a predetermined threshold value and the acquired average RSS with a predetermined reference RSS, respectively, and estimating the quality of the wireless communication channel and quality degradation factors in detail by performing an AND operation with respect to the comparison results. Therefore, it is possible to stably adjust the channel quality.

19 Claims, 7 Drawing Sheets

U.S. PATENT DOCUMENTS

| | | | |
|---|---|---|---|
| 5,991,901 A | 11/1999 | Mulford et al. | |
| 6,999,432 B2* | 2/2006 | Zhang et al. | 370/328 |
| 7,027,409 B2* | 4/2006 | Cain | 370/252 |
| 7,412,241 B2* | 8/2008 | Strutt | 455/445 |
| 2002/0060995 A1 | 5/2002 | Cervello et al. | |
| 2002/0080719 A1* | 6/2002 | Parkvall et al. | 370/235 |
| 2003/0103470 A1* | 6/2003 | Yafuso | 370/282 |
| 2005/0182994 A1 | 8/2005 | Ashikhmin et al. | |
| 2005/0213502 A1* | 9/2005 | Convertino et al. | 370/229 |
| 2006/0050661 A1* | 3/2006 | Shim et al. | 370/318 |
| 2006/0258304 A1* | 11/2006 | Moon et al. | 455/101 |
| 2007/0030821 A1* | 2/2007 | Iwamura et al. | 370/328 |
| 2007/0047461 A1* | 3/2007 | Seo et al. | 370/252 |

FOREIGN PATENT DOCUMENTS

| | | |
|---|---|---|
| KR | 10-2004-0050813 | 6/2004 |
| WO | WO 2005/041462 A2 | 5/2005 |

* cited by examiner

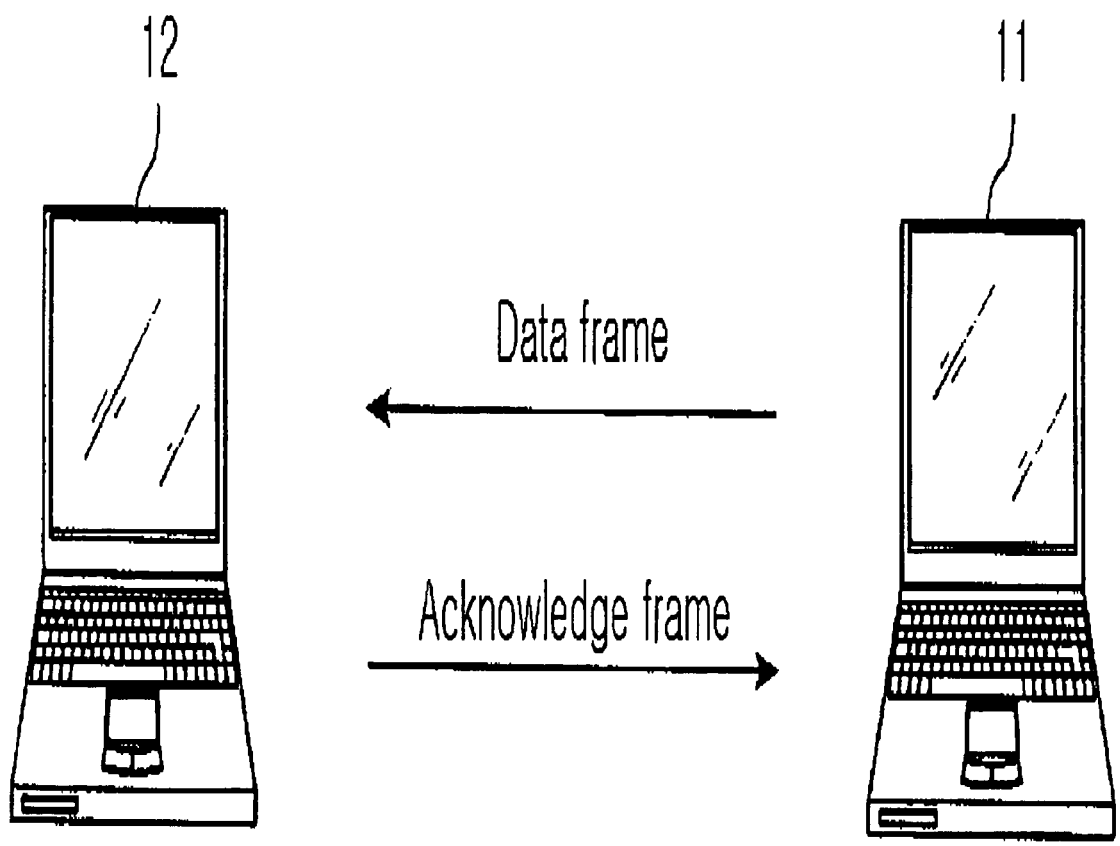
[Fig. 1]

[Fig. 2]
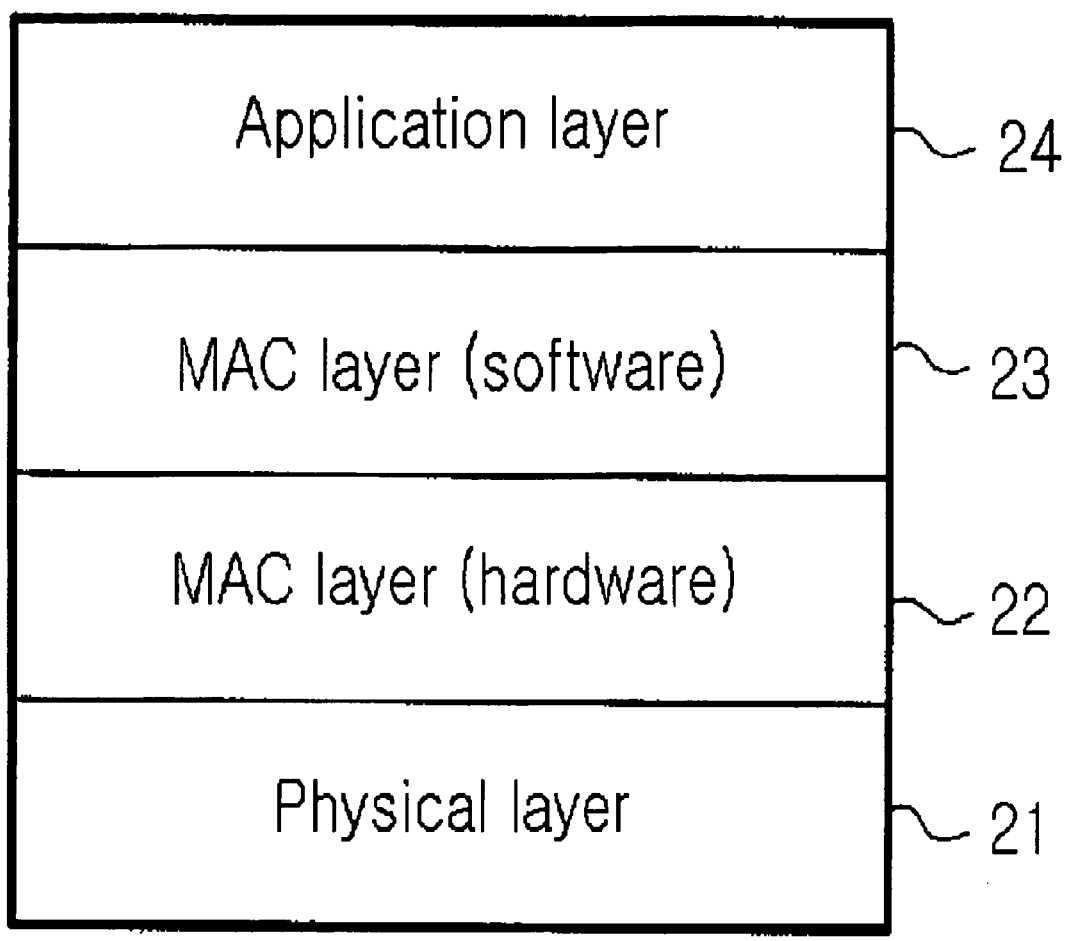

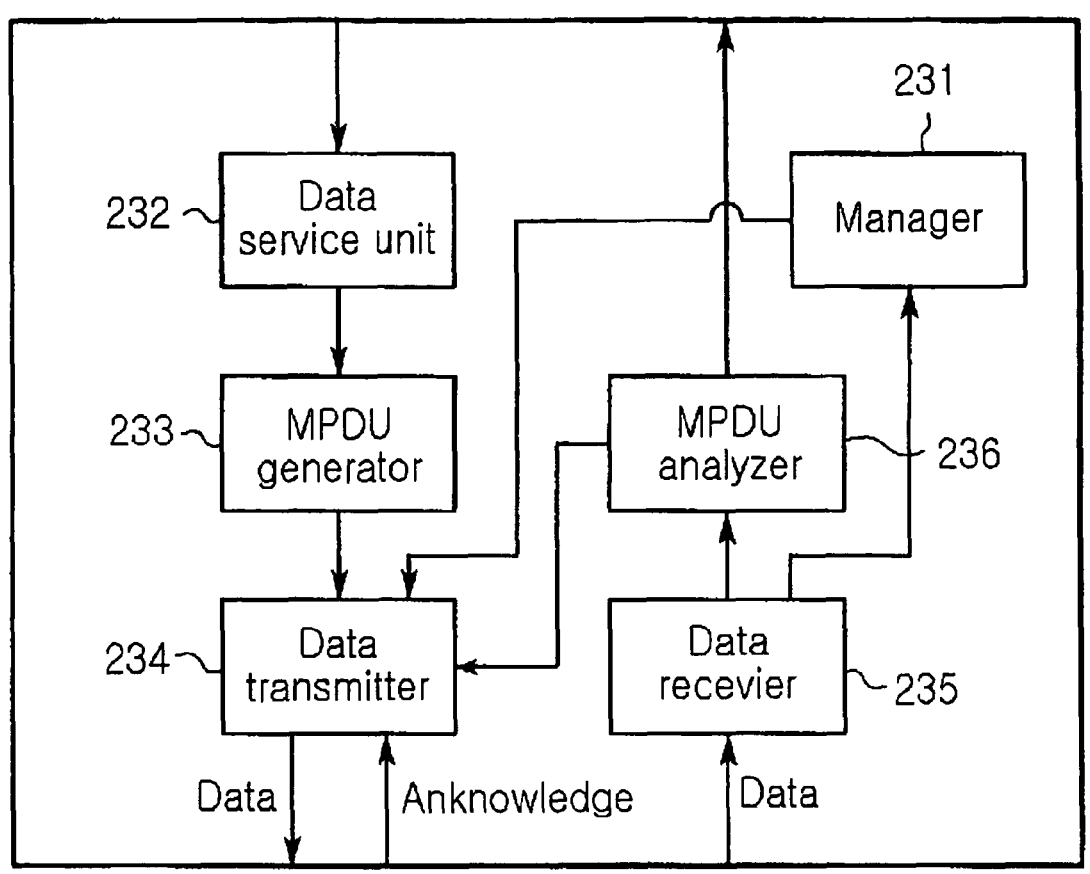
[Fig. 3]

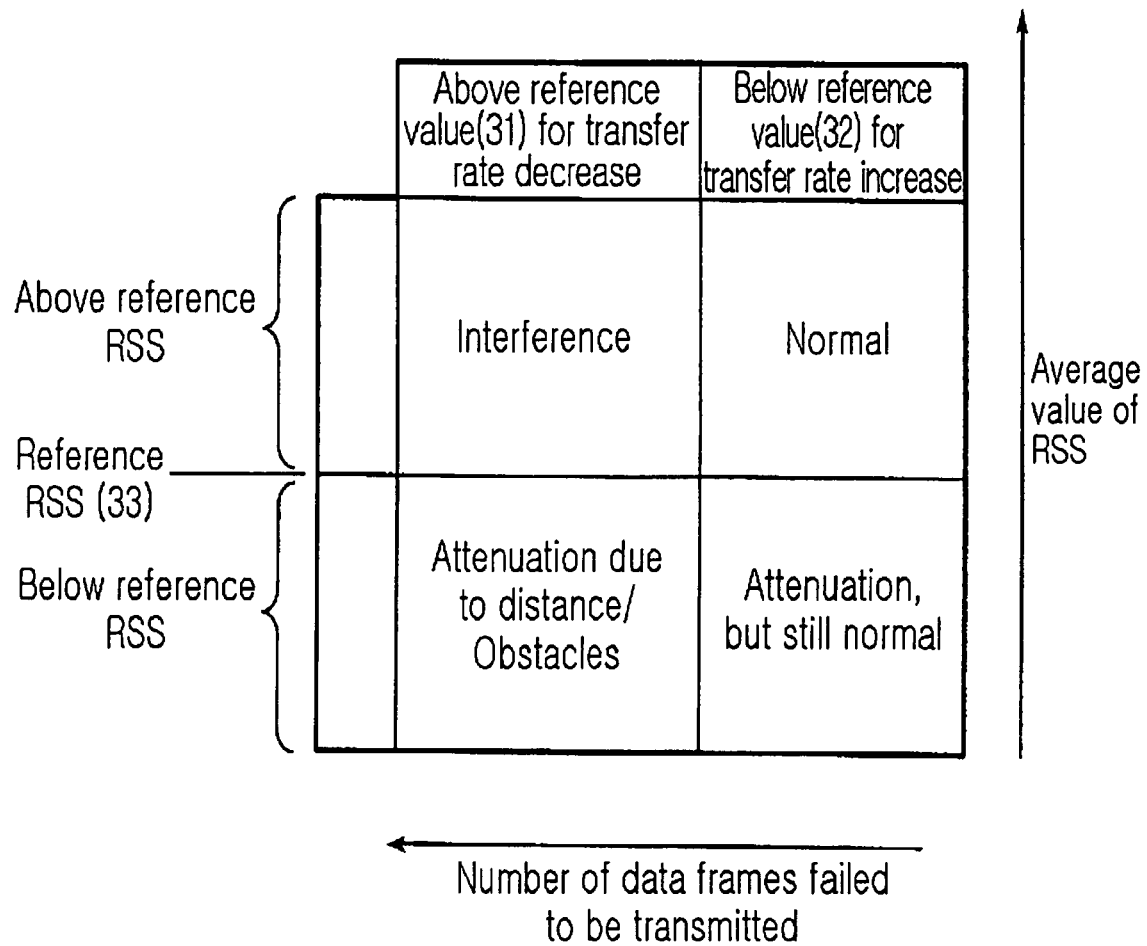
[Fig. 4]

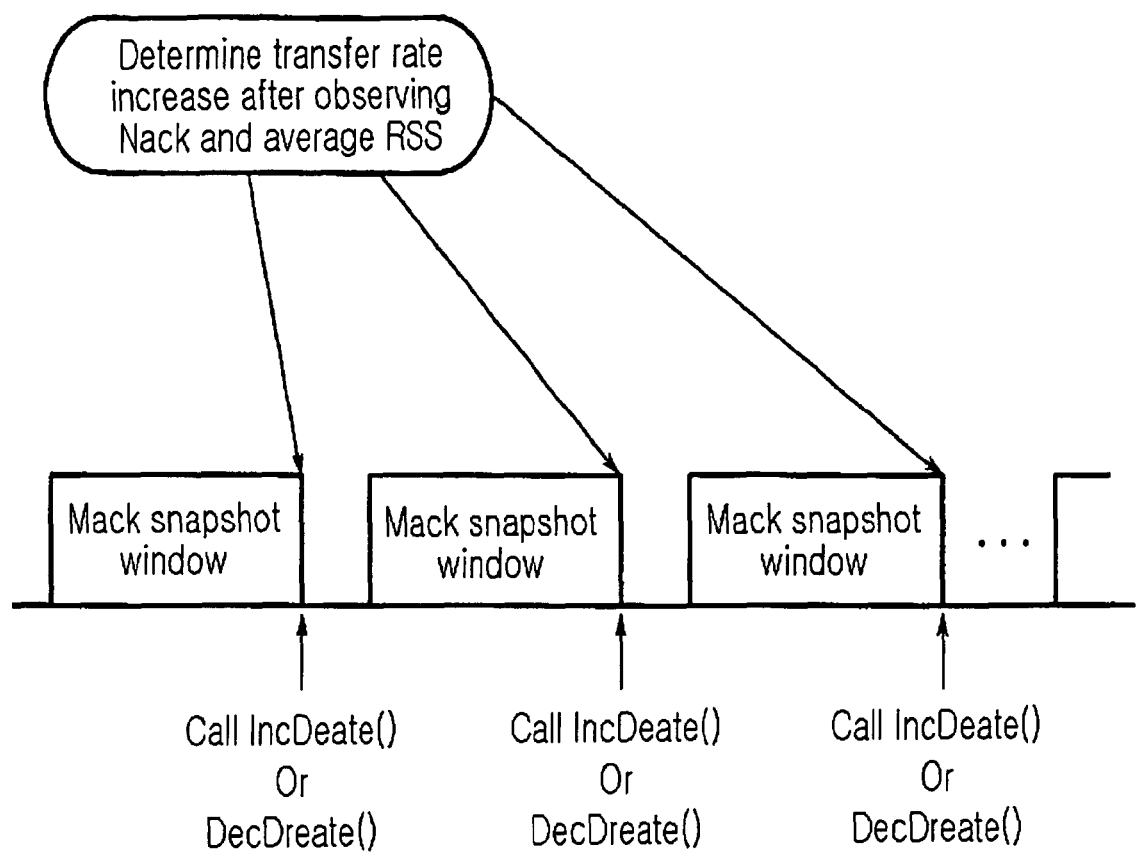

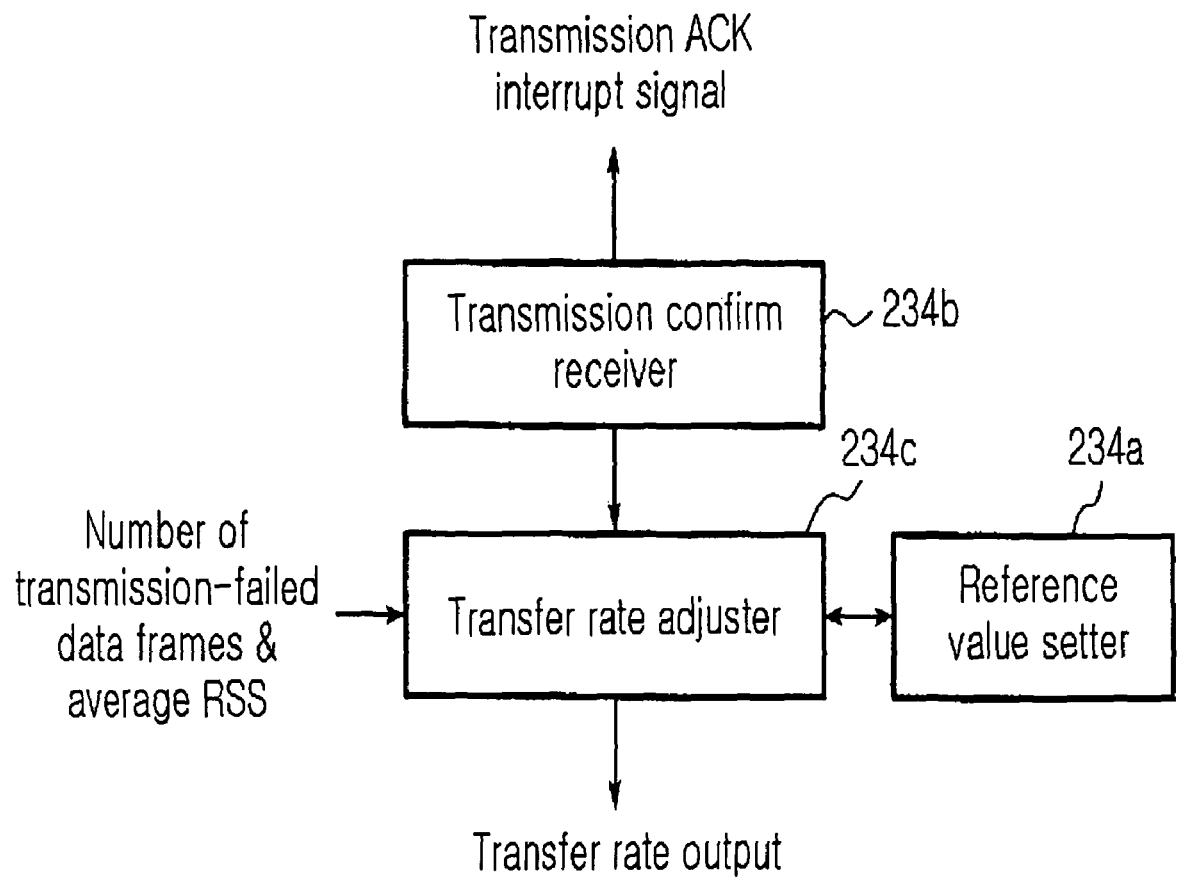
[Fig. 6]

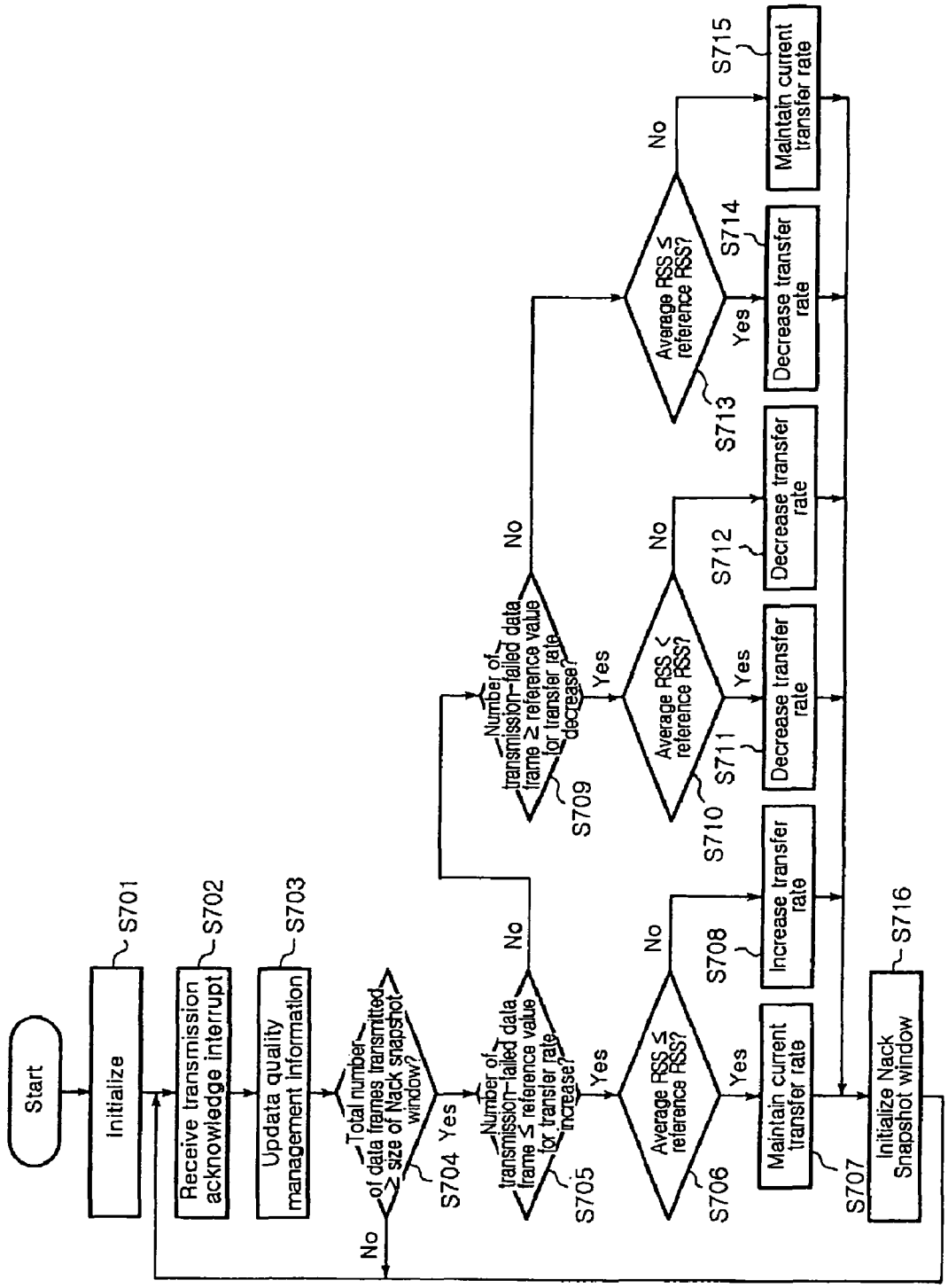

METHOD FOR BALANCING QUALITY OF WIRELESS COMMUNICATION CHANNEL AND WIRELESS COMMUNICATION APPARATUS USING THE SAME

CROSS REFERENCE TO RELATED APPLICATIONS

This application claims the benefit under 35 U.S.C. Section 371, of PCT International Application Number PCT/KR2006/004667, filed Nov. 8, 2006 and Korean Application No. 10-2005-0107553 filed Nov. 10, 2005 in Korea, the contents of all of which are incorporated herein by reference.

TECHNICAL FIELD balancing the quality of a wireless communication channel wherein a media access control (MAC) layer of a wireless communication apparatus analyzes the past transmission conditions of the wireless communication channel and estimates the future transmission state thereof according to the analysis results to balance the transmission quality of the wireless communication channel, and a wireless communication apparatus using the same.

BACKGROUND ART

In general, a wireless communication apparatus refers to a unit that transmits and receives data over a wireless communication channel. This wireless communication apparatus is installed inside or outside of a data processing device, such as a notebook computer, desktop computer or personal digital assistant (PDA), to enable the data exchange of the data processing device with other data processing devices. FIG. 1 schematically shows the configuration of a general wireless communication system. Although wireless communication apparatuses 11 and 12 can generally perform both transmission and reception of data, hereinafter, for the convenience of description, on the basis of one data frame, the wireless communication apparatus 11 that transmits the data frame will be referred to as a transmitting node and the wireless communication apparatus 12 that receives the data frame will be referred to as a receiving node. The receiving node 12 sends an acknowledge frame to the transmitting node 11 after receiving the data frame. Therefore, in this wireless communication system, the transmitting node 11 can check the transmission state of the data frame transmitted thereby through the acknowledge frame.

A representative example of such a wireless communication apparatus is an IEEEE 802.11 wireless local area network (LAN) card that is used in wireless LAN construction. However, in this wireless communication apparatus, wireless signals being transmitted and received between the transmitting node 11 and the receiving node 12 may be subject to interference from wireless signals of different bands adjacent to a wireless communication channel between the transmitting node 11 and the receiving node 12. In addition, in the case where a wider gap or obstacles are present between the transmitting node 11 and the receiving node 12, the signals being transmitted and received may be attenuated, resulting in a degradation in quality of the channel, for example, an irregular variation in the channel quality, and in turn a degradation in data transmission capability of the channel.

In this regard, it is very important in the wireless communication apparatus to estimate the quality of the wireless communication channel and properly adjust the transfer rate of the channel according to the estimation result to balance the transmission quality of the channel.

To this end, a conventional wireless communication apparatus is adapted to estimate the transmission quality of a wireless communication channel on the basis of only the number of data frames failed to be transmitted, among the past transmission conditions of the channel, or on the basis of only a received signal strength (RSS) in data transmission. For example, in the case where the number of data frames failed to be transmitted exceeds a reference value, or the RSS falls below a reference value, the wireless communication apparatus determines that interference has occurred in the wireless communication channel, and thus adjusts the transfer rate of the channel.

However, in the aforementioned conventional quality estimation, it is difficult to definitely state that the transmission quality will also be good in the future even though the past transmission was successful. For this reason, when the transmission quality is estimated on the basis of only the number of data frames failed to be transmitted in the past as stated above, reliability of the estimation result is reduced. Moreover, when interference has occurred, the transmission quality is degraded, but the RSS may often be high. As a result, where the transmission quality is estimated on the basis of only the RSS, external interference makes it difficult to collect accurate RSS values.

DISCLOSURE OF INVENTION

Technical Problem

Therefore, the present invention has been made in view of the above problems, and it is an object of the present invention to provide a method for balancing the quality of a wireless communication channel wherein the quality of the wireless communication channel can be more accurately estimated on the basis of the combination of observation results of the number of data frames failed to be transmitted in the past and a received signal strength, and reliability of data transmission over the channel can thus be increased, and a wireless communication apparatus using the same.

Technical Solution

In accordance with an aspect of the present invention, the above and other objects can be accomplished by the provision of a wireless communication channel quality balancing method of a wireless communication apparatus which transmits and receives data over a wireless communication channel, the method comprising: a) collecting information about whether data frames have been successfully transmitted and information about received signal strengths (RSSs) of the wireless communication channel; b) acquiring the number of data frames failed to be transmitted and an average RSS in a predetermined observation period using the collected information; c) comparing the acquired transmission-failed data frame number with a predetermined threshold value and the acquired average RSS with a predetermined reference RSS, respectively; and d) estimating quality of the wireless communication channel by logically combining a result of the comparison of the transmission-failed data frame number and a result of the comparison of the average RSS.

In accordance with another aspect of the present invention, there is provided a wireless communication apparatus which transmits and receives data over a wireless communication channel, the apparatus comprising: a manager for storing wireless communication channel quality management information including information about transmission states of data frames previously transmitted, and RSS information; a data service unit for receiving data to be transmitted and extracting information necessary for transmission of the received data; a media access control (MAC) protocol data unit (MPDU) generator for generating a MAC header with the information extracted by the data service unit and appending the generated MAC header to the data to be transmitted, to generate an MPDU data frame; a data transmitter for observing the data frame transmission state information and RSS information stored in the manager to determine quality of the wireless communication channel, determining a transfer rate according to the determined wireless communication channel quality and transmitting the MPDU data frame generated by the MPDU generator to a receiving node at the determined transfer rate; a data receiver for receiving a data frame transmitted from a transmitting node, and an acknowledge frame sent from the receiving node when the data frame transmitted by the data transmitter has been successfully transmitted, and storing information about whether the data frame transmitted by the data transmitter has been successfully transmitted and information about an RSS of the received acknowledge frame in the manager, and an MPDU analyzer for receiving the data frame received by the data receiver, and notifying the data transmitter of the fact that the wireless communication channel quality management information has been updated in the manager, upon receiving the acknowledge frame from the data receiver.

Advantageous Effects

According to the present invention, the quality of the wireless communication channel can be more accurately estimated in consideration of both the number of data frames failed to be transmitted in the past and an average RSS. Therefore, reliability of data transmission over the channel can be increased and, in particular, stable multimedia data transmission can be guaranteed.

Moreover, even though the number of transmission failures is increased, owing to the additional observation of the RSS, a detailed distinction can be made between a transmission quality degradation resulting from interference and a transmission quality degradation resulting from a longer communication distance or obstacles and the distinction result can be applied to the data transfer rate, so that the data transmission can be performed more reliably. In addition, even though the number of transmission failures is small, an estimation can be made, with reference to the RSS, as to whether the current state is temporary or continuous and the transfer rate can be adjusted according to the estimation result, thereby raising stability of the data transmission.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view of a wireless communication system to which the present invention is applied;

FIG. 2 is a schematic view showing the layer structure of a wireless communication apparatus according to the present invention;

FIG. 3 is a schematic functional block diagram of the wireless communication apparatus according to the present invention;

FIG. 4 is a channel quality estimation table illustrating a yardstick for channel quality estimation in the wireless communication apparatus according to the present invention;

FIG. 5 is a timing diagram illustrating a transfer rate changing operation for balancing the quality of a wireless communication channel in the wireless communication apparatus according to the present invention;

FIG. 6 is a detailed functional block diagram of a data transmitter in FIG. 3; and FIG. 7 is a flowchart illustrating a method for balancing the quality of the wireless communication channel according to the present invention.

BEST MODE FOR CARRYING OUT THE INVENTION

The present invention is applied to all wireless communication apparatuses in the wireless communication system where the transmitting node 11 transmits a data frame and the receiving node 12 sends an acknowledge frame to the transmitting node 11 after receiving the data frame, as shown in FIG. 1.

FIG. 2 shows the layer structure of a wireless communication apparatus according to the present invention. As shown in this drawing, the wireless communication apparatus according to the present invention basically comprises a physical layer 21, MAC layers 22 and 23, and an application layer 24. The MAC layers 22 and 23 are classified into a MAC hardware layer 22 and a MAC software layer 23.

In this structure, data to be transmitted outputted from the application layer 24 is transformed into a MAC protocol data unit (MPDU) data frame by the MAC software layer 23 and then transferred to the physical layer 21 through the MAC hardware layer 22. Then, the physical layer 21 converts the MPDU data frame into a wireless signal and transmits the converted wireless signal over a wireless communication channel.

Reversely, a wireless signal received over the wireless communication channel is converted into digital data by the physical layer 21 and then sent to the MAC software layer 23 through the MAC hardware layer 22. Then, the MAC software layer 23 analyzes an MPDU of the data sent thereto and transfers only the original data to the application layer 24 as a result of the analysis.

At this time, the MAC software layer 23 estimates the quality of the wireless communication channel and balances the channel quality according to the estimation result. In the present invention, for the estimation of the quality of the wireless communication channel, the MAC software layer 23 collects information about whether a data frame has been successfully transmitted, based on an acknowledge frame acquired by the physical layer 21, and information about an RSS of the acknowledge frame. The channel quality balancing may be performed in various ways. For example, the channel quality may be balanced by adjusting the size, transfer rate or signal strength of a data frame.

In detail, in the case where the wireless communication apparatus according to the present invention operates as the transmitting node 11, the MAC software layer 23 receives information about whether an acknowledge frame associated with a data frame transmitted thereby has been received, and information about an RSS of the received acknowledge frame, and adjusts a data transfer rate on the basis of the received information to balance the transmission quality.

The application layer 24 is adapted to execute an application program. The application layer 24 generates data to be transmitted and sends the generated data to the lower layer. It is also a final destination of data received through the lower layer.

FIG. 3 shows the structure of the MAC software layer 23 associated with the quality estimation and quality balancing in the wireless communication apparatus according to the present invention. The MAC software layer 23 includes, as shown in FIG. 3, a manager 231, data service unit 232, MPDU generator 233, data transmitter 234, data receiver 235, and MPDU analyzer 236.

In this structure, data to be transmitted outputted from the application layer 24 is inputted to the data service unit 232, which then extracts elements necessary for transmission of the inputted data in the MAC layer and transfers the extracted elements to the MPDU generator 233 together with the inputted data.

The MPDU generator 233 generates an MPDU data frame by appending a MAC header to the data transferred from the data service unit 232, and sends the generated MPDU data frame to the data transmitter 234.

The data transmitter 234 transmits the MPDU data frame generated by the MPDU generator 233 to the receiving node 12 through the MAC hardware layer 22 and physical layer 21. At this time, a transmission acknowledge (ACK) interrupt is uploaded from the MAC hardware layer 22 to the data transmitter 234. Further, through a wireless communication channel quality determination process of the present invention, the data transmitter 234 determines whether interference or attenuation has occurred in the wireless communication channel, estimates future transmission quality according to the determination result and adjusts the channel quality according to the estimation result. The channel quality adjustment may be made by changing the size, signal strength or transfer rate of a data frame. These changes for the channel quality adjustment are sent to the physical layer 21 along with the MPDU data frame.

The physical layer 21 transmits a data frame to the receiving node 12 with the changed size, signal strength or transfer rate. Thereafter, upon receiving an acknowledge frame that the receiving node 12 returns after receiving the data frame, the physical layer 21 determines from the received acknowledge frame whether the data frame has been successfully transmitted, measures an RSS of the acknowledge frame and provides the determination and measurement results to the data receiver 235. In detail, the physical layer 21 outputs the transmission acknowledge interrupt to the data transmitter 234 at a predetermined time after transmitting the data frame to the receiving node 12. At this time, if there is an acknowledge frame received from the receiving node 12, the physical layer 21 provides information indicative of a transmission success and an RSS of the received acknowledge frame to the data receiver 235. Conversely, if there is no acknowledge frame received from the receiving node 12, the physical layer 21 provides information indicative of a transmission failure to the data receiver 235. Further, in the case where the wireless communication apparatus according to the present invention operates as the receiving node 12, the data receiver 235 receives a data frame transmitted from the transmitting node 11.

The data receiver 235 receives a data frame transferred through the physical layer 21 and MAC hardware layer 22 and sends the received data frame to the MPDU analyzer 236. The data receiver 235 also receives information about whether a data frame previously transmitted has been successfully transmitted and information about an RSS of an acknowledge frame associated with the data frame from the physical layer 21 and stores the received information in the manager 231.

The MPDU analyzer 236 notifies the data transmitter 234 of the fact that information for management of the quality of the wireless communication channel has been updated in the manager 231, and the data transmitter 234 estimates the quality of the wireless communication channel with reference to the updated channel quality management information in the manager 231 and adjusts the transfer rate, size or signal strength of data frames to be transmitted in the future according to the estimation result to balance the quality of the wireless communication channel.

The wireless communication channel quality management information stored in the manager 231 includes information about whether each data frame has been successively transmitted, and RSS information.

In order to estimate and balance the quality of the wireless communication channel on the basis of the stored wireless communication channel quality management information, it is preferable that the data transmitter 234 adjusts the transfer rate, signal strength or data frame size at a certain period, which is set to the size of a NACK snapshot window. The NACK snapshot window means the number of acknowledge frames to be observed, which corresponds to the total number of data frames transmitted. As a result, the NACK snapshot window can be expressed by the total number of data frames transmitted. In addition, a determination as to whether the NACK snapshot window has reached a set value can be made by counting the transmission acknowledge interrupt sent from the physical layer 21.

FIG. 4 is a table illustrating a yardstick for the estimation of the quality of the wireless communication channel which is performed by the data transmitter 234.

Referring to FIG. 4, the data transmitter 234 observes the number of data frames failed to be transmitted for the period of the NACK snapshot window from the wireless communication channel quality management information stored in the manager 231 and compares the observed transmission-failed data frame number with reference values. The reference values for the comparison of the number of data frames failed to be transmitted are an upper-limit reference value 31 and a lower-limit reference value 32, which are defined depending on signal detection capability of the physical layer 21. The fact that the number of data frames failed to be transmitted is above the upper-limit reference value 31 signifies that a data transmission failure rate is high. In this case, a stabilization operation, such as reducing the transfer rate, is required. Conversely, the fact that the number of data frames failed to be transmitted is below the lower-limit reference value 32 signifies that the transmission state is so good that the data transmission failure rate is low. In this case, it is necessary to raise the transfer rate or maintain it as it is. The upper-limit reference value 31 and the lower-limit reference value 32 are set to different values.

Also, the data transmitter 234 observes an average RSS from the wireless communication channel quality management information stored in the manager 231 and compares the observed average RSS with a reference RSS 33, which is experimentally set depending on the signal detection capability of the physical layer 21. Preferably, the reference RSS 33 is set to a minimum signal strength with which the physical layer 21 can receive data. Some value may be added to the minimum signal strength for adjustment of a risk level.

The fact that the average RSS is above the reference RSS 33 signifies the occurrence of much interference or no interference. Conversely, the fact that the average RSS is below the reference RSS 33 signifies that a signal has been attenuated due to an increase in transmission distance between the transmitting node 11 and the receiving node 12 or the presence of obstacles therebetween.

Therefore, the data transmitter 234 estimates the quality of the wireless communication channel by logically combining the observation results of the number of transmission-failed data frames and the average RSS, an example of which is shown in FIG. 4.

That is, in the case where the number of transmission-failed data frames is below the lower-limit reference value 32 for transfer rate increase and the average RSS is above the reference RSS 33, the data transmitter 234 determines that both the signal strength and transmission state are good and the quality of the wireless communication channel is thus good. In this case, the data transmitter 234 may increase the transfer rate.

Next, in the case where the number of transmission-failed data frames is below the lower-limit reference value 32 and the average RSS is below the reference RSS 33, the data transmitter 234 determines that there is no problem in data transmission, but the received signal strength is low, and the transmission state may thus go bad. In this case, the data transmitter 234 may decrease the transfer rate to balance the transmission quality.

Next, in the case where the number of transmission-failed data frames is above the upper-limit reference value 31 for transfer rate decrease and the average RSS is above the reference RSS 33, the data transmitter 234 determines that external signal interference has occurred. In this case, the data transmitter 234 has to decrease the transfer rate.

Finally, in the case where the number of transmission-failed data frames is above the upper-limit reference value 31 and the average RSS is below the reference RSS 33, the data transmitter 234 determines that the transmission failure rate is high and the signal strength is low, due to an increase in transmission distance between the transmitting node 11 and the receiving node 12 or the presence of obstacles therebetween. In this case, the data transmitter 234 must decrease the transfer rate.

Thereafter, the data transmitter 234 increases or decreases the transmission parameter, namely, the transfer rate, data frame size or signal strength, appropriately according to the results of the estimation of the quality of the wireless communication channel, so as to balance the channel quality at a certain level.

FIG. 5 is a timing diagram illustrating a channel quality balancing operation of the data transmitter 234. The data transmitter 234 collects the number of data frames failed to be transmitted and an average RSS until the total number of data frames transmitted reaches the size of the NACK snapshot window. At the time that the total number of data frames transmitted reaches the size of the NACK snapshot window, as described above with reference to FIG. 4, the data transmitter 234 acquires the number of transmission-failed data frames and the average RSS in the NACK snapshot window, determines the state of the wireless communication channel from the acquired number and average RSS, calls a quality adjusting function, for example, a transfer rate increasing function IncDrate( ) or transfer rate decreasing function DecDrate( ), according to the determination result, and adjusts the channel quality with the called function.

FIG. 6 shows a preferred embodiment of the data transmitter 234. As shown in this drawing, the data transmitter 234 includes a reference value setter 234a for setting/storing the reference values for the estimation of the wireless communication channel quality, namely, the upper-limit reference value 31, the lower-limit reference value 32, the reference RSS 33 and the size of the NACK snapshot window, a transmission confirm receiver 234b for confirming whether information about the transmission states of data frames transmitted has been updated in the manager 231, and a transfer rate adjuster 234c for, if the transmission states of the transmitted data frames are confirmed through the transmission confirm receiver 234b, observing the number of data frames failed to be transmitted and an average RSS for the period of the NACK snapshot window from the manager 231, determining the quality of the wireless communication channel on the basis of the observed transmission-failed data frame number and average RSS, and adjusting the transfer rate in the next period of the NACK snapshot window according to the determination result.

The embodiment of FIG. 6 is an example of the channel quality adjustment using the transfer rate adjustment, in which the transfer rate adjuster 234c is provided as quality adjustment means. Alternatively, the transfer rate adjuster 234c may be substituted with signal strength adjustment means or data frame size adjustment means according to how to adjust the channel quality, or the combination of two or more of those means may be used.

FIG. 7 is a flowchart illustrating a method for balancing the quality of the wireless communication channel according to the present invention. With reference to FIG. 7, a description will hereinafter be given of a process of balancing the quality of the wireless communication channel in the data frame transmission in the wireless communication apparatus.

First, the wireless communication apparatus performs an initialization operation for the estimation of the quality of the wireless communication channel. In this initialization operation, the reference values, namely, the size of the NACK snapshot window, the upper-limit reference value 31, the lower-limit reference value 32 and the reference RSS 33, are set (S701).

Then, in the wireless communication apparatus, a determination is made as to whether a transmission acknowledge interrupt associated with a current data frame transmitted through the data transmitter 234 has been received (S702).

If it is determined that the transmission acknowledge interrupt has been received, the wireless communication apparatus stores information about the transmission state of the current data frame acquired from an acknowledge frame associated with the current data frame and information about an RSS of the acknowledge frame in the manager 231 to update wireless communication channel quality management information in the manager 231 (S703). It should be noted here that the transmission acknowledge interrupt is generated whenever the transmitting node 11 transmits a data frame, and the acknowledge frame is generated whenever the receiving node 12 receives the data frame. Accordingly, if there is an acknowledge frame associated with the current data frame received from the receiving node 12, the wireless communication apparatus determines that the current data frame has been successfully transmitted. However, if there is no acknowledge frame associated with the current data frame received from the receiving node 12, the wireless communication apparatus determines that the current data frame has failed to be transmitted. As stated above, when the transmission acknowledge interrupt is generated, the wireless communication apparatus stores the transmission state information and, further, the RSS information of the received acknowledge frame if the current data frame has been successfully transmitted.

Thereafter, the wireless communication apparatus determines whether the total number of data frames transmitted has reached the set size of the NACK snapshot window (S704).

Upon determining that the total number of data frames transmitted has not yet reached the set size of the NACK snapshot window, the wireless communication apparatus returns to the above step 702 to receive the next transmission acknowledge interrupt.

Conversely, if it is determined that the total number of data frames transmitted has reached the set size of the NACK snapshot window, the wireless communication apparatus compares the number of transmission-failed data frames observed in the NACK snapshot window with the lower-limit reference value 32 (S705).

If the comparison result of step S705 indicates that the number of transmission-failed data frames in the NACK snapshot window is smaller than or equal to the lower-limit reference value nack_threshold[ ].up, the wireless communication apparatus determines that the channel quality is sufficiently good. Notably, in the case where the channel quality is adjusted with the transfer rate, the lower-limit reference value nack_threshold[ ].up is different according to different transfer rates.

The wireless communication apparatus then compares an average RSS observed in the NACK snapshot window with the reference RSS RSS_threshold[ ] to check the transmission quality again (S706). If the comparison result of step S706 indicates that the average RSS in the NACK snapshot window is lower than or equal to the reference RSS RSS_threshold[ ], the wireless communication apparatus determines that the current channel state is good, but the assurance of the transmission quality in the future is impossible due to signal attenuation, etc. Hence, the wireless communication apparatus maintains the current transfer rate as it is, to watch variations of the channel quality (S707). Conversely, if the comparison result of step S706 indicates that the average RSS in the NACK snapshot window is higher than the reference RSS RSS_threshold[ ], the wireless communication apparatus determines that the channel quality is good and no signal attenuation is present, and thus increases the transfer rate to raise transmission efficiency (S708).

On the other hand, if the comparison result of step S705 indicates that the number of transmission-failed data frames in the NACK snapshot window is greater than the lower-limit reference value nack_threshold[ ].up, the wireless communication apparatus compares the number of transmission-failed data frames with the upper-limit reference value nack_threshold[ ].down to determine whether interference has occurred (S709). Notably, the upper-limit reference value nack_threshold[ ].down is different according to different transfer rates.

If the comparison result of step S709 indicates that the number of transmission-failed data frames is greater than or equal to the upper-limit reference value nack_threshold[ ].down, the wireless communication apparatus proceeds to step S710. Otherwise, the wireless communication apparatus compares the average RSS with the reference RSS RSS_threshold[ ] at step S713.

If the comparison result of step S710 indicates that the average RSS is lower than the reference RSS RSS_threshold[ ], the wireless communication apparatus determines that interference has occurred and the distance between the transmitting node 11 and the receiving node 12 is long, or obstacles are present therebetween, and thus decreases the transfer rate (S711). Otherwise, the wireless communication apparatus determines that interference is severe, and thus decreases the transfer rate (S712). On the other hand, if the comparison result of step S713 indicates that the average RSS is lower than or equal to the reference RSS RSS_threshold[ ], the wireless communication apparatus determines that there is no problem in data transmission, but the channel quality may go bad due to signal attenuation, and thus decreases the transfer rate (S714). Conversely, if the comparison result of step S713 indicates that the average RSS is higher than the reference RSS RSS_threshold[ ], the wireless communication apparatus determines that the current transfer rate is normal and no signal attenuation is present, and thus maintains the current transfer rate as it is (S715).

In the case where the channel quality is estimated with only the RSS, a problem occurs as follows. RSSs of data frames failed to be transmitted are not known. For this reason, if the number of data frames failed to be transmitted is larger, the number of data frames successfully transmitted is reduced, resulting in a reduction in the number of RSSs to be used for the channel quality estimation. It is difficult to accurately estimate the channel quality with only the reduced number of RSSs. In contrast, according to the present invention, the channel quality can be more accurately estimated by observing the RSS along with the number of data frames failed to be transmitted, as stated above.

In addition, it is preferable that the rate decrease widths are set to be different at the above rate decreasing steps S711, S712 and S713 because the channel quality degradation factors are different at those steps. Also, the rate decrease widths are different depending on performance of the physical layer 21.

In other words, the rate decrease width at step S714 of decreasing the transfer rate because the channel quality is not degraded yet, but signal attenuation is present, is preferably smaller than that at step S712 or S711 of decreasing the transfer rate because interference is severe, or signal attenuation appears together with interference.

After determining the quality of the wireless communication channel and adjusting the transfer rate according to the determination result, as described above, the wireless communication apparatus initializes the NACK snapshot window again and waits for the next transmission acknowledge interrupt (S716).

Although the quality of the wireless communication channel has been disclosed in the present embodiment to be balanced by changing the transfer rate, the present invention is not limited thereto. For example, a different parameter, such as a signal strength or data frame size, may be used as the control object for the channel quality balancing, as stated previously. Therefore, at the above steps S707, S708, S711, S712, S714 and S715, the signal strength, the data frame size or any other parameter influencing the channel quality may be increased or decreased instead of the transfer rate.

INDUSTRIAL APPLICABILITY

As apparent from the above description, according to the present invention, the quality of the wireless communication channel can be more accurately estimated in consideration of both the number of data frames failed to be transmitted in the past and an average RSS. Therefore, reliability of data transmission over the channel can be increased and, in particular, stable multimedia data transmission can be guaranteed.

Moreover, even though the number of transmission failures is increased, owing to the additional observation of the RSS, a detailed distinction can be made between a transmission quality degradation resulting from interference and a transmission quality degradation resulting from a longer communication distance or obstacles and the distinction result can be applied to the data transfer rate, so that the data transmission can be performed more reliably. In addition, even though the number of transmission failures is small, an estimation can be made, with reference to the RSS, as to whether the current state is temporary or continuous and the transfer rate can be adjusted according to the estimation result, thereby raising stability of the data transmission.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A wireless communication channel quality balancing method of a wireless communication apparatus which transmits and receives data over a wireless communication channel, the method comprising:
  collecting information about whether data frames have been successfully transmitted and information about received signal strengths (RSSs) of the wireless communication channel;
  acquiring the number of data frames failed to be transmitted and an average RSS in a predetermined observation period using the collected information;
  comparing the acquired transmission-failed data frame number with a predetermined threshold value and the acquired average RSS with a predetermined reference RSS, respectively; and
  estimating quality of the wireless communication channel by logically combining a result of the comparison of the transmission-failed data frame number and a result of the comparison of the average RSS.

2. The wireless communication channel quality balancing method according to claim 1, wherein the collecting comprises:
  collecting, as the information about whether the data frames have been successfully transmitted, information about whether an acknowledge frame corresponding to each of the data frames has been received from a receiving node receiving each of the data frames; and
  collecting information about an RSS of the acknowledge frame when having been received, as the RSS information of the wireless communication channel.

3. The wireless communication channel quality balancing method according to claim 1, wherein the threshold value of the transmission-failed data frame number comprises:
  a lower-limit reference value representing a minimum communication efficiency to increase a transfer rate; and
  an upper-limit reference value representing a maximum communication efficiency to decrease the transfer rate.

4. The wireless communication channel quality balancing method according to claim 3, wherein the lower-limit reference value is smaller than the upper-limit reference value, each of the lower-limit reference value and upper-limit reference value being different according to different transfer rates.

5. The wireless communication channel quality balancing method according to claim 1, wherein the reference RSS is higher than a minimum signal strength at which a physical layer receives data.

6. The wireless communication channel quality balancing method according to claim 3, wherein the estimating comprises:
  determining that both a signal strength and a transmission state are good if the transmission-failed data frame number is below the lower-limit reference value and the average RSS is above the reference RSS;
  determining that there is no problem in data transmission, but signal attenuation is present, if the transmission-failed data frame number is below the lower-limit reference value and the average RSS is below the reference RSS;
  determining that the transmission state is deteriorated due to external signal interference if the transmission-failed data frame number is above the upper-limit reference value and the average RSS is above the reference RSS; and
  determining that the signal attenuation appears due to a longer transmission distance or obstacles if the transmission-failed data frame number is above the upper-limit reference value and the average RSS is below the reference RSS.

7. The wireless communication channel quality balancing method according to claim 1, further comprising:
  adjusting the channel quality using a result of the estimation at the.

8. The wireless communication channel quality balancing method according to claim 7, wherein, at the adjusting, the channel quality is adjusted by changing a transfer rate.

9. The wireless communication channel quality balancing method according to claim 7, wherein, at the adjusting, the channel quality is adjusted by changing a signal strength.

10. The wireless communication channel quality balancing method according to claim 7, wherein, at the adjusting, the channel quality is adjusted by changing a data frame size.

11. The wireless communication channel quality balancing method according to claim 8, wherein, at the adjusting, the transfer rate is increased if it is determined that both the signal strength and transmission state are good, and decreased if it is determined that there is no problem in the data transmission, but the signal attenuation is present, if it is determined that the transmission state is deteriorated due to the external signal interference, or if it is determined that the signal attenuation appears due to the longer transmission distance or obstacles.

12. The wireless communication channel quality balancing method according to claim 11, wherein, at the adjusting, the transfer rate is decreased by different widths according to the different channel quality degradation factors.

13. The wireless communication channel quality balancing method according to claim 12, wherein, at the adjusting, the transfer rate, when there is no problem in the data transmission, but the signal attenuation is present, is decreased by a smaller width than that when the transmission state is deteriorated due to the external signal interference, or the signal attenuation appears due to the longer transmission distance or obstacles.

14. A wireless communication apparatus which transmits and receives data over a wireless communication channel, the apparatus comprising:
  a manager for storing wireless communication channel quality management information including information about transmission states of data frames previously transmitted, and RSS information;
  a data service unit for receiving data to be transmitted and extracting information necessary for transmission of the received data;
  a media access control (MAC) protocol data unit (MPDU) generator for generating a MAC header with the information extracted by the data service unit and appending the generated MAC header to the data to be transmitted, to generate an MPDU data frame;

a data transmitter for observing the data frame transmission state information and RSS information stored in the manager to determine quality of the wireless communication channel, determining a transfer rate according to the determined wireless communication channel quality and transmitting the MPDU data frame generated by the MPDU generator to a receiving node at the determined transfer rate;

a data receiver for receiving a data frame transmitted from a transmitting node, and an acknowledge frame sent from the receiving node when the data frame transmitted by the data transmitter has been successfully transmitted, and storing information about whether the data frame transmitted by the data transmitter has been successfully transmitted and information about an RSS of the received acknowledge frame in the manager; and an MPDU analyzer for receiving the data frame received by the data receiver, and notifying the data transmitter of the fact that the wireless communication channel quality management information has been updated in the manager, upon receiving the acknowledge frame from the data receiver.

15. The wireless communication apparatus according to claim 14, wherein the data transmitter comprises:

a reference value setter for setting/storing an upper-limit reference value, a lower-limit reference value, a reference RSS and an acknowledge frame observation period for determination of the wireless communication channel quality;

a transmission confirm receiver for confirming whether the wireless communication channel quality management information has been updated in the manager; and a transfer rate adjuster for determining whether the acknowledge frame observation period has reached a set value if the information update is confirmed by the transmission confirm receiver, observing the number of data frames failed to be transmitted and an average RSS in the acknowledge frame observation period from the manager if the acknowledge frame observation period has reached the set value, comparing the observed transmission-failed data frame number and average RSS with the upper-limit reference value, lower-limit reference value and reference RSS in the reference value setter, respectively, determining the quality of the wireless communication channel according to results of the comparison, and adjusting the transfer rate in a next acknowledge frame observation period according to a result of the determination.

16. The wireless communication apparatus according to claim 15, wherein the lower- limit reference value is smaller than the upper-limit reference value, each of the lower-limit reference value and upper-limit reference value being different according to different transfer rates.

17. The wireless communication apparatus according to claim 15, wherein the reference RSS is higher than a minimum signal strength at which a physical layer receives receive data.

18. The wireless communication apparatus according to claim 15, wherein the transfer rate adjuster is adapted to:

determine that both a transmission state and a signal strength are good and thus increase the transfer rate, if the transmission-failed data frame number is below the lower-limit reference value and the average RSS is above the reference RSS;

determine that the transmission state is currently good, but potentially bad, and thus decrease the transfer rate, if the transmission-failed data frame number is below the lower-limit reference value and the average RSS is below the reference RSS;

determine that the transmission state is deteriorated due to external signal interference and thus decrease the transfer rate, if the transmission-failed data frame number is above the upper-limit reference value and the average RSS is above the reference RSS;

determine that the signal attenuation appears due to a longer transmission distance or obstacles and thus decrease the transfer rate, if the transmission-failed data frame number is above the upper-limit reference value and the average RSS is below the reference RSS; and maintain the transfer rate as it is, in other cases.

19. The wireless communication apparatus according to claim 18, wherein the transfer rate, when the transmission state is currently good, but potentially bad, is decreased by a smaller width than that when the transmission state is deteriorated due to the external signal interference, or the signal attenuation appears due to the longer transmission distance or obstacles.

* * * * *